Dec. 25, 1951  C. K. MADER  2,579,843
METHOD FOR THE MANUFACTURE OF SYNTHESIS GAS
Filed Dec. 10, 1947
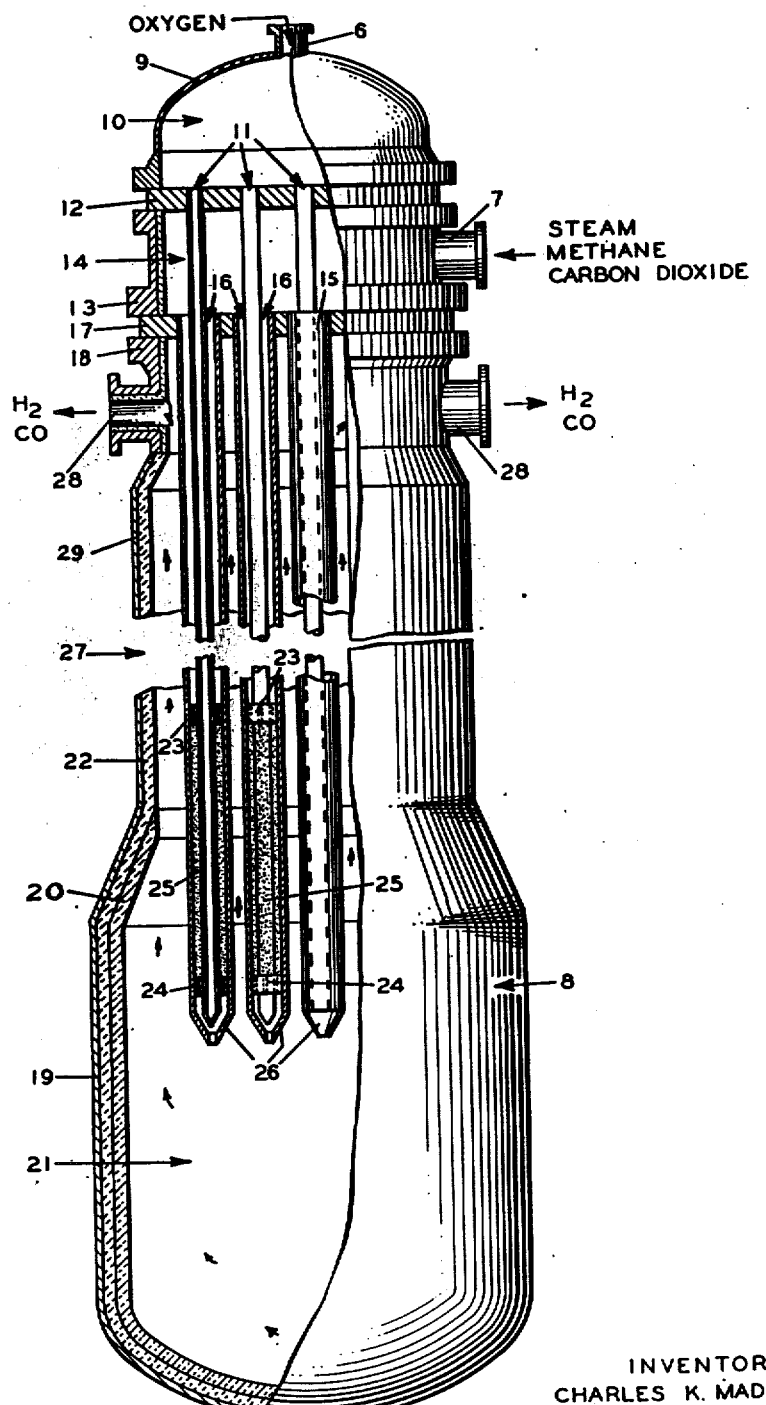
INVENTOR
CHARLES K. MADER
BY E. F. Liebrecht
Cruzan Alexander
ATTORNEYS Patented Dec. 25, 1951

2,579,843

UNITED STATES PATENT OFFICE 2,579,843

METHOD FOR THE MANUFACTURE OF SYNTHESIS GAS

Charles K. Mader, Cresskill, N. J., assignor to The M. W. Kellogg Company, Jersey City, N. J., a corporation of Delaware Application December 10, 1947, Serial No. 790,911

7 Claims. (Cl. 252—373)

This invention relates to the synthesis of organic compounds. In one aspect this invention relates to the method and apparatus for the production of a gas rich in hydrogen and carbon monoxide, useful for the synthesis of organic compounds.

It has been known for some time that a gaseous mixture comprising hydrogen and carbon monoxide in relatively large proportions may be produced by both partial combustion of normally gaseous hydrocarbons, such as methane, and by the reaction of normally gaseous hydrocarbons with steam and/or carbon dioxide. The partial combustion of methane with oxygen as well as the reaction with carbon dioxide to produce hydrogen and carbon monoxide produces these components in a relatively low ratio with respect to each other usually in a mol ratio of less than about 2:1 at a temperature between about 1800 and about 2500° F. The production of hydrogen and carbon monoxide by the reaction between methane and steam produces these components in a mol ratio above about 2:1 at a temperature of about 1250 to about 2400° F. Either of the above reactions may be effected with or without a catalyst. The synthesis of organic compounds from such gaseous mixtures has been effected in the presence of a catalyst, such as a metal or a metal oxide of group VIII of the periodic table. Generally, the mol ratio of hydrogen to carbon monoxide in the feed gas for the synthesis of organic compounds in the presence of such a catalyst is between about 1:1 and about 3:1, preferably a ratio of about 2:1.

Each of the above methods for producing hydrogen and carbon monoxide in relatively large proportions has certain inherent disadvantages. In the partial combustion of methane, the methane feed is preheated prior to combustion for reasons of efficiency and conservation of oxygen. It is desirable to preheat the methane as close to the operating combustion temperature as possible. However, preheating methane above about 1200° F. results in the decomposition of the methane and deposition of carbon in the preheater. This, of course, has its obvious disadvantages. In order to obtain the required temperature in the partial combustion of methane excess oxygen must be supplied because of the inability to preheat the feed above about 1200° F. The use of excess oxygen results in an expensive process.

Similarly, in the conversion of methane with steam, a disadvantage is the fact that usually a relatively small proportion of carbon monoxide is produced by this method. In order to overcome the deficiency of carbon monoxide, simultaneous conversion of carbon dioxide with methane has been practiced. This latter method is inadequate for numerous reasons, one being that extraneous carbon dioxide must be supplied. Furthermore, since the conversion of methane with steam is a moderately endothermic reaction, heat must be supplied, such as by indirect combustion of fuel. It is, therefore, desirable to provide a method and apparatus for alleviating or minimizing the above described difficulties and disadvantages inherent in the partial combustion and in the reforming of methane by the processes heretofore practiced.

An object of this invention is to provide a process for the synthesis of organic compounds.

Another object of this invention is to provide a method and apparatus for the conversion of normally gaseous hydrocarbons into hydrogen and carbon monoxide.

It is another object of this invention to provide a method and apparatus for the production of a synthesis gas having the desired hydrogen to carbon monoxide mol ratio between about 1:1 and about 3:1.

Still a further object of this invention is to provide a process for the partial combustion of methane having a relatively large yield of carbon monoxide and consuming a relatively small quantity of oxygen.

It is still a further object of this invention to decrease the temperature of preheating required in the conversion of methane to hydrogen and carbon monoxide by partial combustion with oxygen.

A further object of this invention is to provide a method and apparatus to increase the temperature of partial combustion of methane to produce hydrogen and carbon monoxide.

Various other objects and advantages will become apparent to those skilled in the art from the following description and disclosure.

In the drawing:

The accompanying drawing diagrammatically illustrates, partly in cross-section, an elevational view of an elongated reaction chamber positioned substantially vertically for the conversion of normally gaseous hydrocarbons to hydrogen and carbon monoxide for use in the synthesis of organic compounds. The synthesis gas unit of the drawing is capable of producing sufficient feed gas to produce 1500 barrels per day of normally liquid products.

The principal elements of the reaction chamber of the drawing comprise a primary header or bonnet 9 having an oxygen inlet 6 therein, a secondary header or channel section 13 having a methane inlet 7, oxygen preheating tubes 11, methane reforming tubes 15 and combustion chamber 8 having effluent outlets 26.

Primary header 9 is a cylindrical section having an elliptical end through which inlet 6 is inserted. Primary header 9 is constructed of one inch steel clad with ⅜ inch stainless steel. Attached to the other end of header 9 is a conventional circular tube sheet 12 having depending therefrom a plurality of open tubes or conduits 11. Tube sheet 12 is a 5⅛ inch thick steel plate and is connected to primary header 9 and channel section 13 by conventional means known to those skilled in the art, such as by welding, bolting or clamping. From the top of header 9 to tube sheet 12 is about 32 inches. The tube bundle 11 comprises 282 ¼ inch Inconel tubes. Channel section 13 comprises a flanged cylindrical shell constructed of steel and having a suitable inside lagging, as shown. The inside diameter of headers 9 and 13 is about 74 inches. The upper portion of channel section 13 is connected in a suitable manner to the lower side of tube sheet 12, as shown. A second conventional circular tube sheet 17 constructed of 5 inch thick steel plate is attached to the lower end of channel section 13 by welding, bolting or clamping. Tube sheet 17 has 282 open Inconel tubes 15 of 3 inch diameter depending therefrom and into which tubes 11 are concentrically inserted. The distance between tube sheets 12 and 17 is about 2 feet and 2 inches. Tubes 11 and 15 are welded to their respective tube sheets so that fluid cannot pass between distributing zones 10 and 14 formed by header 9 and section 13, respectively.

A lower enclosed shell or combustion chamber 8, preferably cylindrical, is attached to the underside of tube sheet 17 and encloses tubes 11 and 15. Combustion chamber or shell 8 comprises an upper outlet section 18 having two gas outlets 26 therein, a middle section 29 and a lower or end section 19 of enlarged cross-sectional dimension. Shell 19 is lagged internally with an outer layer 20 of approximately 6 inches of zirconium oxide and an inner layer 22 between the steel shell and the zirconium oxide layer of about 6 inches of high temperature insulating fire brick. Outlet section 28 of combustion chamber 8 has about a 74 inch inside diameter and the lower enlarged section 19 has about a 106 inch inside diameter excluding the insulation. The total length of combustion chamber 8 is approximately 33 feet. The outlet section 28 is approximately 3 feet in length and the lower section 19 is approximately 11 feet in length.

Numeral 25 indicates catalyst particles positioned in the annular space 16 between tubes 11 and tubes 15. The catalyst composition will be discussed fully hereinafter during the description of the operation of the apparatus. Perforated metal plugs 24 are fixed in the lower portion of tubes 15 to support the catalyst particles therein. Similar perforated plugs 23 are positioned at the top of the catalyst layer in tubes 15 as shown. Plugs 23 may be omitted if desired. Ceramic nozzles 26 are attached to the ends of tubes 15.

Elliptical head 9 and combustion chamber 8 are constructed of A. S. M. E. SA-70 rolled steel. Tube sheets 12 and 17 are constructed of A. S. M. E. SA-212 rolled steel. Channel section 13 is constructed of A. S. M. E. SA-105 forged steel. Although specific materials of construction have been specified, other construction materials and specifications may be used as will become apparent to those skilled in the art without departing from the scope of this invention.

Numeral 27 indicates a break in the drawing and thus the apparatus is not shown in its true length. The elements of the apparatus on either side of the break 27 are substantially the same. The over-all length of the apparatus shown is approximately 39 feet. The length of tubes 15 are approximately 20 feet. The length of the tubes and vessel may be longer or shorter, depending upon the heat duty required.

The enlarged lower section 19 of combustion chamber 8 provides a combustion zone 21 of sufficient size to permit the required residence time of the reactants for partial combustion of methane and enables increased thickness of the lining of that portion of combustion chamber 8 which is the hottest. The distance between the ends of tubes 15 and the bottom of chamber 8 is sufficient to prevent direct impingement of flames thereon.

The positioning of the reaction chamber of the drawing in a substantial vertical position is one of the important features of the apparatus because this enables the hanging of tubes 11 and 15 downwardly from their respective tube sheets. As a consequence, no further support of tubes 11 and 15 is required than tube sheets 12 and 17, and free expansion of tubes is permitted. Positioning of the reaction chamber so that tubes 11 and 15 project upward from tube sheets 12 and 17 into combustion chamber 8, although not as desirable as the position shown, is within the scope of this invention. In the modification of the apparatus in which tubes 11 and 15 stand upright, plugs 23 are essential to hold catalyst 25 in place and plugs 24 may be necessary to prevent catalyst 25 from being blown out of tubes 11.

In some instances it is desirable to have catalyst in combustion zone 21. A catalyst suitable for the promotion of the oxidation of methane is nickel or nickel oxide supported on Alundum in the form of pellets or granules. Although partial combustion of methane can be effected without a catalyst the use of a catalyst in combustion zone 21 is within the scope of this invention. If a catalyst is used for the partial combustion of methane, preferably, it is placed in the space between tubes 15 and shell 19 of combustion chamber 8 and supported by suitable means, not shown.

Various insulating and high temperature resisting material may be used as internal lagging without departing from the scope of this invention. Although two outlets are shown in outlet section 28, only a single outlet may be necessary. Various other alterations and modifications of certain features of the apparatus and the dimensions thereof may be practiced by those skilled in the art without departing from the scope of this invention. Although the apparatus of the drawing and elements thereof have been described as cylindrical in shape, such shape is preferred but other shapes, such as octagonal, may be employed.

*Operation*

In the operation of the apparatus of the drawing to convert methane to a gas rich in hydrogen and carbon monoxide useful for the synthesis of organic compounds therefrom, methane, steam, and/or carbon dioxide are continuously introduced into manifold or distributing zone 14 through inlet conduit 7. The steam, methane, and/or carbon dioxide mixture is preferably preheated prior to introduction into manifold zone 14 to a temperature between about 200 and about 1000° F. and with this invention a preheat temperature of less than about 800° F. is usually sufficient for high yields of hydrogen and carbon monoxide. The mol ratio of carbon dioxide and steam to organic carbon (carbon combined in the form of methane) is between about 1.3 to about 3.5 and usually less than about 2. The preheated mixture passes from distributing zone 14 into annular space 16 between tubes 11 and tubes 15. Heat is transferred from gases in combustion zone 21 through the walls of tubes 15 to the gaseous mixture of steam, methane, and/or carbon dioxide in annular space 16. By means of this heat the temperature of the gaseous mixture is raised to the conversion temperature of methane whereby the methane, steam, and/or carbon dioxide are converted to hydrogen and carbon monoxide. Since the conversion of methane with steam and carbon dioxide is endothermic, heat is continuously supplied from the hot gases of combustion zone 21. The gases in annular space 16 flow through perforated plugs 23, catalyst 25 and plugs 24. During the passage of the gases through annular space 16 the gases are heated and reacted to convert about 20 to about 50 per cent of the methane, preferably between about 30 and about 40 per cent. Any suitable reforming catalyst may be used, such as nickel or nickel oxide supported on alumina or other supporting material. A satisfactory catalyst for the reforming operation contains in parts by weight 1NiO, 0.2Cr$_2$O$_3$, 1.68SiO$_2$, 0.9MgO. Other reforming catalysts comprise molybdenum, cobalt, and chromium and their oxides and sulfides.

When a nickel catalyst is used the temperature of the effluent gas from annular space 16 is between about 1100 and about 1600° F., preferably between about 1300 and about 1500° F. The effluent contains unreacted methane and passes through nozzles 26 into which substantially pure oxygen, preferably of at least 90 per cent purity, is injected by means of tubes 11. Oxygen is continuously introduced through inlet conduit 6 into manifold or distributing zone 10 by means of which it is distributed uniformly into tubes 11. Oxygen is preheated in tubes 11 to a temperature between about 500 and about 1600° F., preferably to a temperature between about 600 and about 800° F. If desired, the oxygen may be preheated prior to introduction in the manifold section 10 without departing from the scope of this invention. In order to keep the oxygen preheat temperature in the preferred range, it may be necessary to insulate the oxygen tubes 11.

The amount of oxygen introduced and admixed with the effluent from annular space 16 is sufficient to partially combust the unreacted methane to hydrogen and carbon monoxide. The mol ratio of oxygen to organic carbon is between about 0.5 and about 0.7 and in accordance with the preferred operation of this invention may be less than about 0.6. Since the partial combustion of methane with oxygen is an exothermic reaction the temperature of combustion zone 21 is between about 1800 and about 3000° F. and for smooth and continuous operation a temperature of between about 2100 and about 2600° F. is appropriate. The hot gases of reaction in combustion zone 21 has countercurrently in indirect heat exchange with the flow of gases in annular space 16 and are continuously removed from the upper portion of combustion chamber 8 through outlet conduits 28. In passing countercurrently to the flow of gases in annular space 16 the hot gases of combustion zone 21 give up part of their sensible heat and in this manner provide the endothermic heat of reaction for the reforming operation. For this reason preheating of the steam, methane, and/or carbon dioxide mixture to a relatively high temperature is unnecessary and a relatively high combustion temperature in combustion zone 21 can be achieved without the use of the usual high preheating temperature. Actually, the feed gases to combustion zone 21 are preheated simultaneously with the reforming operation and in this manner carbon deposition is prevented or minimized.

The gas outlet temperature in conduits 28 is between about 500 and about 1500° F., preferably between about 600 and about 1200° F., depending on such factors as residence time, ratio of methane to oxygen, etc.

The pressure of the reforming operation and partial combustion operation in combustion chamber 8 is between about 10 and about 800 pounds per square inch gage, preferably between about 50 and about 500 pounds per square inch gage.

The gases from conduits 28 comprise hydrogen and carbon monoxide in a mol ratio between about 1:1 and about 3:1. These gases also contain water formed during the partial combustion and reforming of methane. This water is removed from the effluent gases from conduits 28 by cooling (not shown) the reaction effluent to a temperature below about 200° F. to condense the steam. After condensation of the steam the remaining gaseous effluent containing the hydrogen and carbon monoxide is passed to a conventional synthesis reaction chamber (not shown), with or without preheating, for the conversion of the carbon monoxide and hydrogen to hydrocarbons and oxygenated organic compounds in the presence of a suitable catalyst and under suitable operating conditions known to those skilled in the art. Pressures below about 500 pounds per square inch gage and temperatures between about 300 and about 700° F. are appropriate for the synthesis reaction. The synthesis reaction effluent is then passed to conventional separation and recovery equipment (not shown) for removal of the oxygenated organic compounds and hydrocarbons from normally gaseous components of the effluent and unreacted reactants. The normally gaseous components, such as methane and carbon dioxide, and unreacted reactants, such as hydrogen, are recycled to the methane converter of the drawing and may be introduced therein through inlet conduit 7.

The following examples are offered as a means for better understanding of the invention and should not be construed as unnecessarily limiting to the invention.

EXAMPLE I

This example illustrates the results obtained for the conversion of methane to hydrogen and carbon monoxide with the apparatus and method of the drawing (Case 2) in comparison with the partial combustion of methane accompanied by conventional preheating of the feed (Case 1).

Table I

Feed gas composition:

| | Mol percent |
|---|---|
| $CH_4$ | 37.0 |
| $CO_2$ | 21.0 |
| $H_2O$ | 42.0 |
| | 100.0 |

| Operating Conditions | Case 1-Preheat and Partial Combustion | Case 2 Present Invention |
|---|---|---|
| Preheat Temp., °F | 1,400 | 350 |
| Operating Pressure, p. s. i. g. | 300 | 300 |
| $O_2/CH_4$ in Feed | 0.5 | 0.5 |
| Temp. of gas to Combustion zone 21, °F | | 1,400 |
| Equilibrium Combustion Temperature, °F | 1,600 | 2,500 |

| Effluent Composition | Case 1 | Case 2 |
|---|---|---|
| $CH_4$ Mol per cent | 0.9 | |
| $CO_2$ do | 11.3 | 8.8 |
| $CO$ do | 21.7 | 26.7 |
| $H_2$ do | 39.8 | 37.2 |
| $H_2O$ do | 26.3 | 29.3 |
| $H_2/CO$ do | 1.8 | 1.4 |
| Mols CO made/mol $CH_4$ | 1.00 | 1.25 |
| Mols $CO_2$ in Prod./mol $CO_2$ Feed | 0.92 | 0.56 |

In Case 2 the products of combustion in the combustion step are used to supply the heat for the partial reforming operation which in turn increases the equilibrium combustion temperature attainable. The above example represents one way of expressing the advantage of partial reforming as it shows an increase in the formation of carbon monoxide by operations in accordance with this invention. The advantage of this invention may also be expressed in another way. If we assume the same oxygen to methane ratio and desire the same equilibrium temperature for each method of operation as above, it will be necessary to preheat the feed gas to about 2390° F. using the conventional preheating operation to obtain the product composition indicated for a partial combustion temperature of 2500 instead of 1600° F. This is not practical since the methane will crack to hydrogen and carbon before such temperature can be obtained. By the use of partial reforming before the partial combustion of methane with oxygen and the indirect transfer of heat from the partial combustion step to the reforming step, less oxygen is required to reach a given equilibrium combustion temperature than would be required with a conventional preheating operation. It is possible to obtain a high equilibrium temperature of combustion by the use of 1400° F. preheat in the conventional manner and the use of a relatively large quantity or excess of oxygen. Accordingly, the equilibrium temperature of partial combustion of 2500° F. may be reached with a preheat temperature of 1400° F. by increasing the oxygen to methane ratio in case one of the examples from 0.5 to 0.7 or 0.8. This is uneconomical because of the use of excess oxygen.

EXAMPLE II

Example II makes a comparison similar to Example I between the method of the present invention for producing hydrogen and carbon monoxide (Case 2) and the conventional method of preheat plus partial oxidation of methane. In Example II the feed is substantially free from carbon dioxide.

Table II

Feed gas composition:

| | Mol percent |
|---|---|
| $CH_4$ | 37 |
| $H_2O$ | 63 |

| Operating Conditions | Case 1-Preheat and Partial Combustion | Case 2-Preheat and Present Invention |
|---|---|---|
| Preheat Temp., °F | 1,400 | 350 |
| Operating Pressure, p. s. i. g. | 250 | 250 |
| $O_2/CH_4$ in feed | 0.55 | 0.55 |
| Temp. of gas to combustion zone 21, °F | | 1,400 |
| Equilibrium Combustion temperature, °F | 1,840 | 2,725 |
| Heat Exchange Duty 1,000 of B. T. U | 4,000 | 7,238 |

| Effluent Composition | Case 1 | Case 2 |
|---|---|---|
| $CH_4$ Mol per cent | 0.2 | 0 |
| $CO$ do | 15.2 | 17.7 |
| $CO_2$ do | 6.0 | 3.6 |
| $H_2O$ do | 32.6 | 34.8 |
| $H_2$ do | 46.0 | 43.9 |
| | 100.0 | 100.0 |
| Mols CO made/mol $CH_4$ in feed | 0.713 | 0.83 |
| $H_2/CO$ | 3.0 | 2.5 |

It is evident from Table II that this invention increases the amount of carbon monoxide produced and consequently lowers the ratio of $H_2/CO$. According to the present invention the reactions for the partial combustion and reforming of methane are effected in such a manner as to mutually benefit each since the exothermic heat from the partial combustion reaction is recovered to supply the endothermic heat for the reforming reaction. Less oxygen is required for the combined reactions of this invention than would be required for either reforming or partial combustion alone.

I claim:

1. A process for the conversion of methane to hydrogen and carbon monoxide which comprises the steps of preheating methane to a temperature between about 200 and about 1000 degrees Fahrenheit, reforming about 20 to about 50 per cent of the preheated methane with steam in a reforming zone to produce carbon monoxide and hydrogen, passing the reforming effluent at a temperature between about 1100 and about 1600 degrees Fahrenheit into a combustion zone, partially burning substantially all of the unreacted methane in the reforming effluent at a temperature between about 1800 and about 3000 degrees Fahrenheit with oxygen supplied to the combustion zone in a ratio of from about 0.5 to about 0.7 mol of oxygen per mol of unreacted methane to produce additional quantities of hydrogen and carbon monoxide, maintaining the pressure in the reforming and combustion zones between about 10 and about 800 pounds per square inch gage, countercurrently passing the combustion products in indirect heat exchange with the reaction mixture in the reforming zone whereby the exothermic partial combustion reaction supplies heat to the endothermic reformation, and withdrawing a product comprising hydrogen and carbon monoxide in a molar ratio between about 1:1 and about 3:1.

2. A process according to claim 1 in which the reforming reaction is carried out in the presence of a nickel-containing reforming catalyst.

3. A process according to claim 1 in which the oxygen is preheated to a temperature between about 500 and about 1600 degrees Fahrenheit.

4. A process according to claim 1 in which said product is withdrawn from the heat exchange zone at a temperature between about 500 and about 1500 degrees Fahrenheit.

5. A process according to claim 1 in which carbon dioxide is introduced into the reforming zone.

6. A process for the conversion of methane to hydrogen and carbon monoxide which comprises the steps of preheating methane to a temperature between about 200 and about 800 degrees Fahrenheit, reforming about 30 to about 40 per cent of the preheated methane with steam in the presence of a nickel-containing catalyst in a reforming zone to produce carbon monoxide and hydrogen, passing the reforming effluent at a temperature between about 1300 and about 1500 degrees Fahrenheit into a combustion zone, partially burning substantially all of the unreacted methane in the reforming effluent at a temperature between about 2100 and about 2600 degrees Fahrenheit with oxygen supplied to the combustion zone in a ratio of from about 0.5 to about 0.6 mol of oxygen per mol of unreacted methane to produce additional quantities of hydrogen and carbon monoxide, maintaining the pressure in the reforming and combustion zones between about 50 and about 500 pounds per square inch gage, countercurrently passing the combustion products in indirect heat exchange with the reaction mixture in the reforming zone whereby the exothermic partial combustion reaction supplies heat to the endothermic reformation, and withdrawing a product comprising hydrogen and carbon monoxide in a molar ratio between about 1:1 and about 3:1.

7. A process according to claim 6 in which carbon dioxide is introduced into the reforming reaction.

CHARLES K. MADER.

REFERENCES CITED

The following references are of record in the file of this patent:

UNITED STATES PATENTS

| Number | Name | Date |
|---|---|---|
| 1,812,341 | Jaeger | June 30, 1931 |
| 1,826,548 | Jaeger | Oct. 6, 1931 |
| 1,905,326 | Wilcox | Apr. 23, 1933 |
| 1,927,286 | Jaeger et al. | Sept. 19, 1933 |
| 1,960,912 | Larson | May 29, 1934 |
| 1,971,728 | Perry | Aug. 28, 1934 |
| 2,199,475 | Wilcox | May 7, 1940 |
| 2,520,717 | Hagerbaumer | Aug. 29, 1950 |

FOREIGN PATENTS

| Number | Country | Date |
|---|---|---|
| 683,626 | France | June 16, 1936 |